United States Patent [19]

Baatz

[11] 4,090,901
[45] May 23, 1978

[54] RECAPPING METHOD

[76] Inventor: Guenter Adolf Baatz, 29 Chicopee Terrace, Kitchener, Ontario, Canada, N2A 1T2

[21] Appl. No.: 802,018

[22] Filed: May 31, 1977

[30] Foreign Application Priority Data

May 17, 1977 Canada .................. 278552

[51] Int. Cl.² .......................................... B29H 17/36
[52] U.S. Cl. ....................................... 156/96; 23/290; 156/286; 156/382
[58] Field of Search ............... 156/96, 126–129, 156/394, 382, 285, 286; 23/290

[56] References Cited

U.S. PATENT DOCUMENTS

| 3,236,709 | 2/1966 | Carver | 156/128 |
|---|---|---|---|
| 3,325,326 | 6/1967 | Schelkmann | 156/96 |
| 3,672,009 | 6/1972 | Pike | 23/290 |
| 3,769,121 | 10/1973 | Martin | 156/96 |
| 3,884,739 | 5/1975 | Hindin et al. | 156/96 |
| 3,925,128 | 12/1975 | Elder | 156/96 |
| 3,969,179 | 7/1976 | Foegelle | 156/96 |

Primary Examiner—William A. Powell
Assistant Examiner—John E. Kittle
Attorney, Agent, or Firm—George H. Riches and Associates

[57] ABSTRACT

This invention relates to a method of recapping tires. The tire to be recapped is placed within an envelope with the recap thereabout. A hose runs from inside the envelope to outside the tank in which the tire is placed. Hot water is pumped into the air-tight tank. The rising air and water pressure force the air out of the envelope and press the envelope firmly against the recapped tire to hold the recap securely in place. As water leaks in the envelope cause rejects, the present method advances the art by allowing for an early detection of leaks in the envelope. As well, the usual methods remove the air from the envelope by creating a vacuum in the tank. This method uses the simpler process of creating a higher pressure in the tank to force the air out of the envelope.

7 Claims, 5 Drawing Figures

RECAPPING METHOD

BACKGROUND OF THE INVENTION

This invention relates generally to an improved method of recapping tires, and particularly to a method of curing new treads onto old tires for both automobile and truck tires.

In the past, tires have been recapped in pressure kettles under pressurized steam or pressurized hot water. The tire tread is placed over the periphery of the tire to be recapped and then a covering is placed over the tread and tire surface to hold the tread on the tire while the heat from the steam or water cures the tread onto the tire.

Problems have arisen for several reasons, one being that the cover usually would not completely cover the tire and so water and water gas would get in between the tire and tread to interfere with the curing. The covers were then replaced with flexible envelopes which were airtight. However, the problem then became that under the high pressure of about 80 psi needed to cure the tread onto the tire, air bubbles force their way into the tire rubber again resulting in the production of an inferior product.

More recently, vacuum pumps have been used to pump the air out of the envelope before the heat and pressure is applied to avoid the air bubble problem. The addition of a vacuum pump system also results in the addition of extra cost to the system.

Again, another problem using the known systems is that quite often the envelopes would be flawed and the flaw would not be detected until after the water has covered the tires or the steam has been introduced into the kettle. It should be noted that at the present level of technology in the industry, the failure rate of these envelopes is normally in the range of 10%. An earlier system of detecting flaws in the envelopes is therefore necessary to lower costs and increase productivity.

The present invention relates most closely to the "hot water system" of recapping tires. The use of hot water is preferred to the use of steam as with steam curing the temperature is usually quite in excess of that preferred if the desired pressure is to be obtained. As well, when the steam system is used, cold air must first be pumped into the system to get the pressure up before the steam is introduced as the early introduction of steam will result in an unsatisfactory curing at too low a pressure. This means that there is a need for a two-step system, one to first introduce air to raise the pressure and one to then introduce steam to raise the temperature. A hot water system is a single step system as the water supplies both the temperature and pressure and so is much simpler to operate.

In the present invention, the recapped tire is first placed within the envelope which is completely sealed. Then the sealed envelopes are hung in the kettle. Present methods demand that a vacuum line be run from the envelope to a vacuum unit outside the kettle. A vacuum is drawn on each envelope and the envelope is collapsed onto the recap holding it in place during the curing.

The kettle is then shut and water at about 200° F and 80 psi is pumped into the kettle. The recapped tires cure therein for about four hours if they are normal automobile car tires. Of course, the time will vary depending on many factors including the tire size.

When the curing is completed the water is removed from the kettles and the tires from the envelopes. Quite often, the recess in the bottom of the tire is filled with water when the operation is completed. A system is therefore needed which would automatically remove the water from these recesses.

With the types of vacuum units used to collapse the envelope, if the envelope has a leak of any kind it is usually not detected until the water has filled into the kettle to the extent that the flaw is covered with water and water is being drawn into the vacuum pump. The kettle must then be emptied and the flaw located and fixed. A method is therefore needed to help in detecting leaks before the water filling step has proceeded too far.

SUMMARY OF THE INVENTION

Accordingly it is an object of the present invention to at least partially overcome the disadvantages by providing a system whereby vacuum pumps are eliminated by raising the air pressure slightly in the kettle and collapsing the envelopes on the tire and treads. Any flaws can then be detected at this time as the air will continue to escape out through the air hoses attached to the flawed envelopes after it has stopped coming out from the unflawed envelopes. This type of individual inspection and comparison is not possible in the old system where the cost of vacuum units demands that all the air hoses be connected in parallel to the one vacuum unit.

To this end, in one of its aspects, the invention provides a method of recapping tires comprising the steps of placing a precured tread on a prepared tire, enclosing the tread in an air and water tight flexible envelope, placing the enclosed tire into a hot water pressure kettle, introducing a small amount of water into the kettle to slightly increase the air pressure, yet to increase it sufficiently to force the air out of the envelopes via air vents leading from the interior of the envelope to the outside of the kettle, and to press the envelope against the tread to hold it securely against the tire, after all the air is expelled from the envelope, introducing more water into the kettle to cover the tire in water at a temperature and a pressure sufficient to cure the tires, leaving the tire under the pressurized hot water for a predetermined time until the tire is cured, and removing the water and pressure from the kettle and the cured tire from the envelope.

In another of its aspects, the invention further provides a method to remove the water trapped in the bottom recess of the tires wherein a small hollow tube overhangs from the lower inner recess of the hanging tire into which water collects in the bottom of the kettle to self-siphon the water out of the lower portion of the hanging tire when the water level in the kettle is dropped below the tire level.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
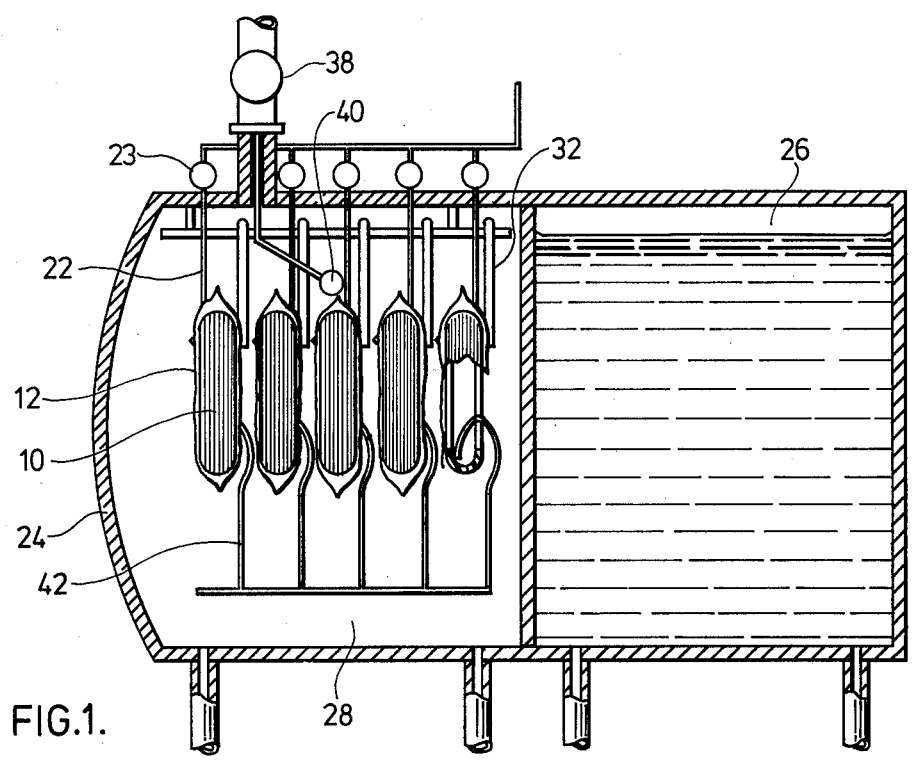
FIG. 1 is a view of the type of kettle which may be used in the present invention showing the tires hanging therein before any water is introduced into the curing tank.

Reference is first made to FIG. 1 showing the envelope-enclosed tires 10 hanging in a hot water kettle 24 in the centre of the curing tank 28 on hangers 32. There are air vents 22 running from the inside of each envelope 12 through holes in the kettle walls to the atmosphere where air escaping from the inside of the tank is detected.

Figure 2:
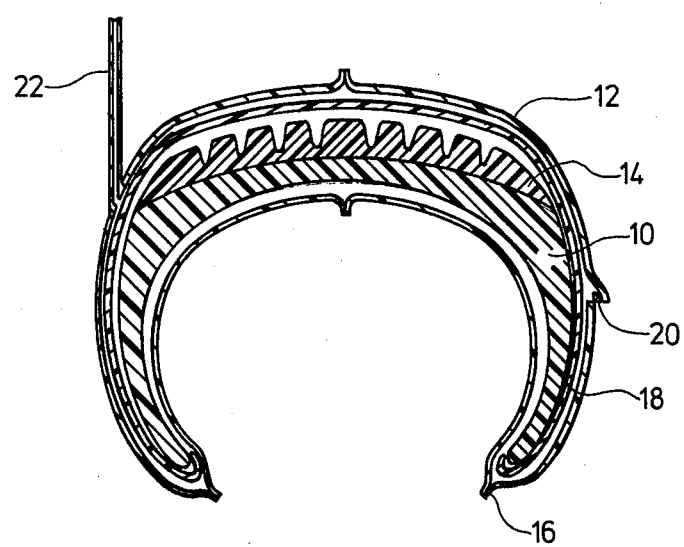
FIG. 2 is a cut-away view of the tire inside an envelope.

Reference is now made to FIG. 2 showing a cross-sectional view of the tire 10 enclosed within a flexible envelope 12. This envelope 12 must be both air-tight and water-tight to prevent both pressurized air and water from entering into the envelope and interfering with the curing process. The envelope is donut-shaped as is the tire and is usually formed of several pieces of material spliced together. Spliced joints 16 are indicated in FIG. 2.

It is standard practice to have the tire to be retreaded first buffed and an uncured cushion (not shown) cemented thereto. The precured tread 14 is then placed over the casing and stitched onto the tire 10. A venting material 18, to prevent the trapping of air pockets in the envelope when it is collapsed against the tread and tire, is preferably placed over the outside of the tire before the tire is placed inside the envelope. The envelope is closed with a sealing joint 20 of some kind. As a means of escape for the air from inside the envelope when the exterior pressure is increased, an air vent 22 is provided which runs from the envelope to outside the kettle.

Reference to all figures will now be made to demonstrate the method used in the present invention. The hot water kettle is generally referred to by reference numeral 24. One half of the kettle 24 is a water storage tank 26 and the other half is a curing tank 28. A pumping and heating system 30 connects the storage and curing tanks. (FIGS. 4 & 5) The tires 14 are hung in the centre of the curing tank 28 on hangers 32. Air vents 22 run from each tire through holes in the wall of the kettle to points exterior of the kettle where the presence or absence of an airflow from each of the vents can be individually detected by simple and inexpensive gauges. If each of the air vents ended in a small container of water, then the presence of air bubbles would indicate whether air was still coming from the envelopes. This is just one example of the type of simple systems which could be used to detect flaws in the envelopes. Of course, any suitable type of air indicator could be used.

While the curing tank is not being filled with water, valves V3 and V4 are open while valves V1 and V2 are closed. Pump 34 pumps water through the pumping and heating system 30 through heater 36 to heat the water in the storage tank at the desired temperature. Then, when the tires have been properly prepared in the envelopes and are hanging on hangers 32 in the curing tank 28, the curing tank is closed air tight except for a pressure valve control unit 38 by which the air pressure in the curing tank can be controlled.

Figure 3:
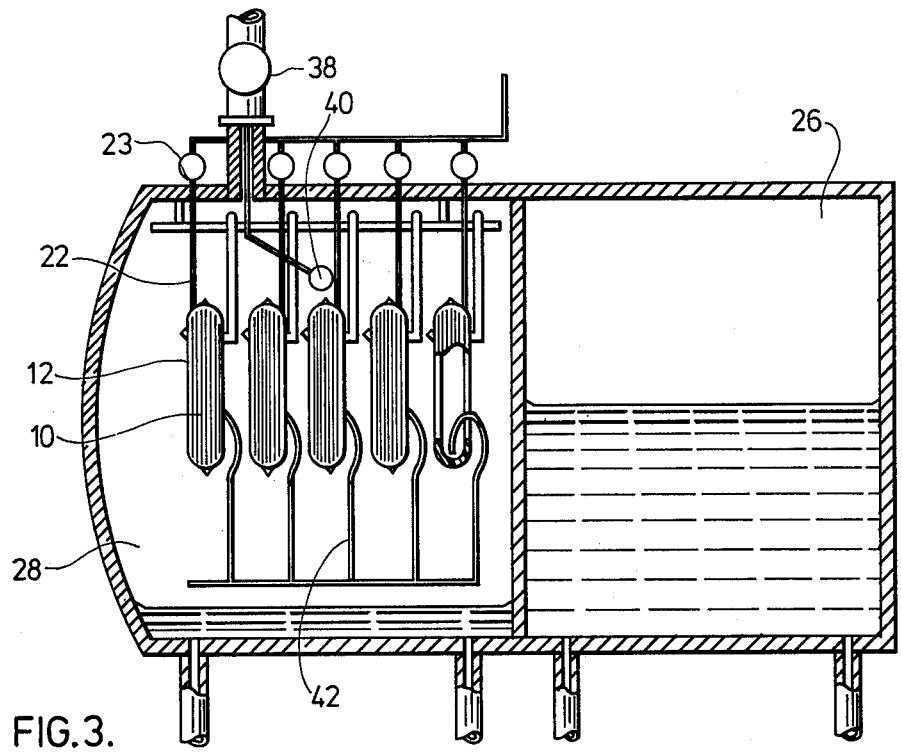
FIG. 3 shows the first step of introducing water into the curing tank and collapsing the envelopes against the tires.

Valve V3 is closed and valve V1 is opened and a small amount of water is introduced into the bottom of the curing tank. (FIG. 3) The pressure valve control unit 38 stays closed allowing the air pressure to rise to about 15 psi or whatever is necessary in order to create a sufficient pressure differential across the envelope to force the air out of the envelope through air vent 22 and collapse the envelope against the tire and tread. Should there be too much water at the beginning and the air pressure subsequently threatens to rise too quickly, then the pressure control valve unit 38 is set to allow enough air to escape from the curing tank 28 to keep the pressure at the desired low pressure. It is very important that the pressure not rise too quickly at this point for if air pockets should form between the tire and the envelope then the higher pressure to follow could force air bubbles through the backing of the tire into the tire itself. These air bubbles tend to reduce the quality of the tire as a result.

At this point the gauges 23 are checked to insure that air has stopped flowing out of air vents 22 after a certain period of time. If the air continues to escape via an air vent then the indication is that there is a flaw in the envelope. This is not completely infrequent occurrence for as noted earlier the present technology produces approximately a 10% failure rate in these envelopes. It is very much simpler to correct flaws in envelopes with the present method as only a small amount of water has been introduced into the curing tank and the air pressure is still not very high. In presently known systems using vacuum pumps the leak is not discovered until after the curing tank has been filled with water above the level of the flaw and water has entered into the vacuum system. It is much quicker and more economical to use the present method instead of those presently known.

Figure 4:
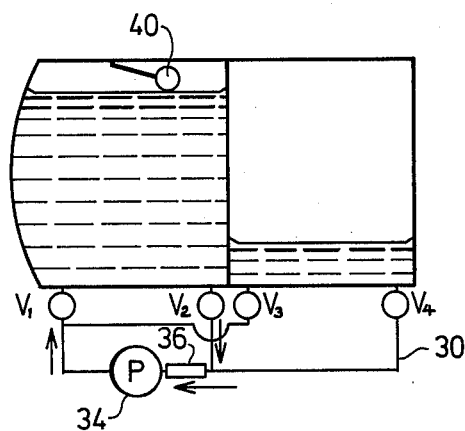
FIG. 4 shows the curing tank full.

Once it has been assured that the envelopes are all intact, the water is once again directed into the curing tank 28 from the water storage tank 26. When the water reaches a certain level, it makes contact with a float control 40 which is forced upwards with the rising water. This float 40 is connected to the pressure valve control unit 38 so that the air pressure and water pressure are now forced up to a pressure necessary to cure the tread to the tire by closing the valve control unit. Once the desired curing pressure, which in the present situation is preferred to be about 80 psi, has been reached the valve V4 is closed and valve V2 is opened. The water is then circulated solely within the closed system as shown in FIG. 4. The water is heated and kept at a sufficient temperature to cure the tire. In the present situation, if one uses a pressure of about 80 psi then the water temperature should be about 200°–210° F.

Figure 5:
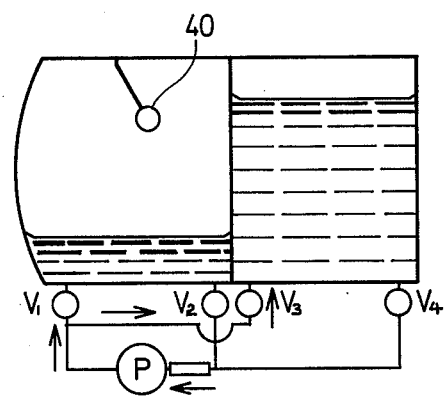
FIG. 5 shows the curing tank empty.

The hot pressurized water is kept in the curing tank for the necessary amount of time to cure the tire. For most automobile tires this would be about 4 hours. Of course, the size of the tire, temperature and pressure all contribute to the length of time for which the tire must be cured. After the time period has elapsed, a time device (not shown) closes valve V1 and opens valve V3 as shown in FIG. 5. The curing tank then empties of water, valve V2 is closed and valve V4 is opened in order that the water in the storage tank may continue to be circulated and heated by the pump 34 and heater 36. The process can then be immediately repeated. The time device might also operate to open the pressure contol valve unit to allow the curing tank to drain more quickly at the end of the curing period.

Another aspect of the invention can be seen in FIG. 1. This is a self-siphoning system which consists of a siphon tube 42 which has one end located in the bottom of the recess in the tire in which water collects when the curing tank 28 is filled with water. When the water level is lowered below the rim of the tire, the water in the tire recess will siphon out of the tube 42 and into the bottom of the curing tank. This eliminates the need for the usual subsequent manual emptying of the water-filled recesses.

The advantages of this invention are several-fold. Both the vacuum pump to take the air out of the envelope and the pump to take the water out of the tire recess have been eliminated. There is a lower capital cost because of the elimination of these pumps. The leak detection system is much-improved as leaks are detected and fixed more easily and water is not allowed into the flawed envelopes before the leak is detected, forcing them to be completely dried before continuing. The system allows a single operating system to both force the air out of the curing tank and fill the curing tank with the proper pressure and temperature. The system is also easier to operate as water is being used rather than steam, and a steam system is generally more difficult, dangerous and expensive to run.

Although the disclosure describes and illustrates a preferred embodiment of the invention, it is to be understood that the invention is not restricted to this particular embodiment.

I claim:

1. An improved method of recapping rubber tires using hot water to cure a tread onto a prepared tire comprising the steps of:
   (a) enclosing a tread covered tire in an air-tight flexible envelope,
   (b) placing the enclosed tires into a sealed container,
   (c) introducing a small amount of water into the container to increase the air pressure in the container sufficiently to force the air out of the envelopes via vent means leading from the interior of the envelope to the atmosphere to press the envelope against the tread to hold it securely against the tire,
   (d) after the air is expelled from the envelope, introducing more water into the kettle to cover the tire in water at a predetermined temperature and pressure,
   (e) maintaining the water in the container under the predetermined temperature and pressure for a predetermined time until the tire is cured, and
   (f) removing the water from the container and the cured tire from the envelope.

2. A method as claimed in claim 1 wherein the pressure in the container after step (c) is about 15 psi and after step (d) about 80 psi.

3. A method as claimed in claim 2 wherein the pressure in the container is kept at about 80 psi for about 4 hours for regular automobile tires.

4. A method as claimed in claim 3 wherein the temperature of the water during curing is about 200°–210° F.

5. A method as claimed in claim 4 wherein the water in the container is kept well circulated to ensure an even heat distribution.

6. A method as claimed in claim 1 wherein the tires are hung in the kettle.

7. A method as claimed in claim 6 wherein a hollow tube overhangs from the lower inner recess of the hanging tire, in which the water collects, into the bottom of the kettle to self-siphon the water out of the lower portion of the hanging tire when the water level in the kettle is dropped below the tire level.

* * * * *